United States Patent
Kroll et al.

(10) Patent No.: US 11,928,489 B2
(45) Date of Patent: *Mar. 12, 2024

(54) EXTENSION APPLICATION MECHANISMS THROUGH INTRA-PROCESS OPERATION SYSTEMS

(71) Applicant: SAP SE, Walldorf (DE)

(72) Inventors: Marco Kroll, Berlin (DE); Lutz Gericke, Potsdam (DE); Michael Perscheid, Potsdam (DE); Alexander Boehm, Schwetzingen (DE)

(73) Assignee: SAP SE, Walldorf (DE)

( * ) Notice: Subject to any disclaimer, the term of this patent is extended or adjusted under 35 U.S.C. 154(b) by 0 days.

This patent is subject to a terminal disclaimer.

(21) Appl. No.: 17/209,852

(22) Filed: Mar. 23, 2021

(65) Prior Publication Data

US 2021/0232416 A1    Jul. 29, 2021

Related U.S. Application Data

(63) Continuation of application No. 16/373,859, filed on Apr. 3, 2019, now Pat. No. 10,990,427.

(51) Int. Cl.
*G06F 9/455* (2018.01)
*G06F 9/38* (2018.01)
(Continued)

(52) U.S. Cl.
CPC ........ *G06F 9/45554* (2013.01); *G06F 9/3885* (2013.01); *G06F 9/4406* (2013.01);
(Continued)

(58) Field of Classification Search
CPC .. G06F 9/45554; G06F 9/3885; G06F 9/4406; G06F 9/45558; G06F 9/5016; G06F 9/5022
See application file for complete search history.

(56) References Cited

U.S. PATENT DOCUMENTS 8,510,369 B1    8/2013  Ekke et al.
9,189,520 B2   11/2015  May et al.
(Continued)

OTHER PUBLICATIONS

Extended European Search Report issued in European Application No. 19189077.1 dated Mar. 6, 2020, 9 pages.
(Continued)

*Primary Examiner* — Hang Pan
(74) *Attorney, Agent, or Firm* — Fish & Richardson P.C.

(57) ABSTRACT

The present disclosure relates to computer-implemented methods, software, and systems for providing extension application mechanisms. Memory is allocated for a virtual environment to run in an address space of an application that is to be extended with extension logic in a secure manner. The virtual environment is configured for execution of commands related to an extension functionality of the application. A virtual processor for an execution of a command of the commands is initialized at the virtual environment. The virtual processor is operable to manage one or more guest operating systems (OS). A first guest OS is loaded at the allocated memory and application logic of the extension functionality is copied into the allocated memory. The virtual environment is started to execute the first guest OS and the application logic of the extension functionality in relation to associated data of the application in the allocated memory.

20 Claims, 4 Drawing Sheets

(51) Int. Cl.
*G06F 9/4401* (2018.01)
*G06F 9/50* (2006.01)

(52) U.S. Cl.
CPC ........ *G06F 9/45558* (2013.01); *G06F 9/5016* (2013.01); *G06F 9/5022* (2013.01); *G06F 2009/45575* (2013.01); *G06F 2009/45583* (2013.01)

(56) References Cited

U.S. PATENT DOCUMENTS

| | | | |
|---|---|---|---|
| 9,378,233 | B2 | 6/2016 | Lee et al. |
| 10,061,808 | B2 | 8/2018 | Kim et al. |
| 2009/0007139 | A1 | 1/2009 | Jacobson et al. |
| 2009/0265715 | A1* | 10/2009 | Erlingsson ............ G06F 9/4411 718/1 |
| 2010/0146379 | A1* | 6/2010 | George ................. G06F 21/53 709/219 |
| 2010/0306759 | A1 | 12/2010 | Kohler et al. |
| 2011/0093638 | A1 | 4/2011 | Divirgilio et al. |
| 2011/0246617 | A1 | 10/2011 | Sheehan et al. |
| 2015/0074663 | A1 | 3/2015 | Robinson et al. |
| 2015/0149481 | A1 | 5/2015 | Lee et al. |
| 2015/0261576 | A1* | 9/2015 | Gong .................. G06F 9/45558 711/6 |
| 2015/0347617 | A1 | 12/2015 | Weinig et al. |
| 2016/0026791 | A1* | 1/2016 | Melski .................... G06F 21/54 726/25 |
| 2016/0147555 | A1* | 5/2016 | Hepkin ..................... G06F 9/44 718/1 |
| 2017/0147671 | A1 | 5/2017 | Bensberg et al. |
| 2017/0177663 | A1 | 6/2017 | Moerkotte et al. |
| 2017/0371909 | A1 | 12/2017 | Andrei et al. |
| 2018/0011875 | A1 | 1/2018 | Bensberg et al. |
| 2018/0246809 | A1 | 8/2018 | Rebholz et al. |
| 2018/0253473 | A1 | 9/2018 | Ziegler et al. |
| 2018/0341678 | A1 | 11/2018 | Moerkotte et al. |
| 2018/0341679 | A1 | 11/2018 | Moerkotte et al. |
| 2020/0034062 | A1* | 1/2020 | Gill ........................ G06F 3/0647 |
| 2020/0319902 | A1 | 10/2020 | Kroll |

OTHER PUBLICATIONS

Minnich, "Akaros Virtualization: VMs as Threads," 5th RISC-V Workshop, Nov. 2016, 24 pages.

\* cited by examiner

EXTENSION APPLICATION MECHANISMS THROUGH INTRA-PROCESS OPERATION SYSTEMS

CLAIM OF PRIORITY

This application claims priority under 35 USC § 120 to U.S. patent application Ser. No. 16/373,859, filed on Apr. 3, 2019, entitled "EXTENSION APPLICATION MECHANISMS THROUGH INTRA PROCESS OPERATION SYSTEMS"; the entire contents of which are hereby incorporated by reference.

TECHNICAL FIELD

The present disclosure relates to computer-implemented methods, software, and systems for extending application functionality in a secure manner by executing extension application logic at a virtual environment at the address space of the application.

BACKGROUND

Software complexity is increasing and causes changes in the software product cycles, requirements, and possibilities for delivery of software applications and platform systems. Customer's needs are being transformed to request flexibility in terms of processes, landscape, and software components. Development of new software applications often times relies on existing, previously developed functionality, or on integrations between software applications to perform more complex use cases. There are a number of scenarios where software components or entire applications are provided for reuse by customer, partner, developers, consultants, or other end users. For example, software platforms may provide functionality that can be extended and therefore new application can be built on top of them.

Applications may run as software-as-a-service (SaaS) solutions and provide various services when requested by an end user (e.g., customer). In that manner, a customer of an on-demand application is free from the procurement and maintenance of the hardware and software that is needed for the execution of the application. Cloud application may be implemented as a set of application services that provide functionality to end user in different scenarios.

SUMMARY

The present disclosure involves systems, software, and computer implemented methods for extending application's functionality in a secure manner by executing extension application logic at a virtual environment at an allocated memory in an address space of the application. One example method may include operations such as: allocating memory for a virtual environment to run in an address space of an application, wherein the virtual environment is configured for execution of commands related to an extension functionality of the application; initializing a virtual processor for an execution of a command from the commands at the virtual environment, the virtual processor operable to manage one or more guest operating systems (OS); loading a first guest OS of the one or more guest OS, the first guest OS being loaded at the allocated memory and copying application logic of the extension functionality into the allocated memory; and starting the virtual environment to execute the first guest OS and the application logic of the extension functionality in relation to associated data of the application in the allocated memory.

Implementations can optionally include one or more of the following features. In some instances, a hypervisor is provided as a compiled library for interfacing with the application in relation to execution of the extension functionality, the hypervisor associated with the one or more guest OS and the application logic of the extension functionality. Further, these and other implementations can also optionally include starting the application to execute commands at a host system; identifying the command related to the extension functionality of the application during runtime of the application; and in response to determining that the virtual processor is to be initialized for the execution of the command, initializing the virtual processor for the execution of the command. Further, these and other implementations can also optionally include: providing application data related to the extension functionality into the memory of the virtual environment as read-only data; and executing the command at the virtual environment based on the application data as stored in-memory; and in response to completing the execution of the command, stopping the virtual environment to deallocate the memory.

In some instances, a hypervisor manages the virtual environment including one or more virtual machines and their corresponding virtual processors. Further, these and other implementations may optionally include that a virtual processor included in the virtual environment, managed by a hypervisor, is initialized and the initializing includes setting up a register for the virtual processor. Further, these and other implementations may optionally include that the guest OS includes minimum viable code required to execute the command and the extension functionality of the application, and wherein the guest OS is compiled as a library and linked with the extension functionality. Further, these and other implementations may optionally include that in response to identifying the command for execution, creating a first thread for executing the command at the virtual environment; and in response to identifying a second command, creating a second thread separate from the first thread, the second thread for execution at the virtual environment in parallel with the first thread.

Similar operations and processes may be performed in a system comprising at least one process and a memory communicatively coupled to the at least one processor where the memory stores instructions that when executed cause the at least one processor to perform the operations. Further, a non-transitory computer-readable medium storing instructions which, when executed, cause at least one processor to perform the operations may also be contemplated. In other words, while generally described as computer implemented software embodied on tangible, non-transitory media that processes and transforms the respective data, some or all of the aspects may be computer implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DETAILED DESCRIPTION

Figure 1:
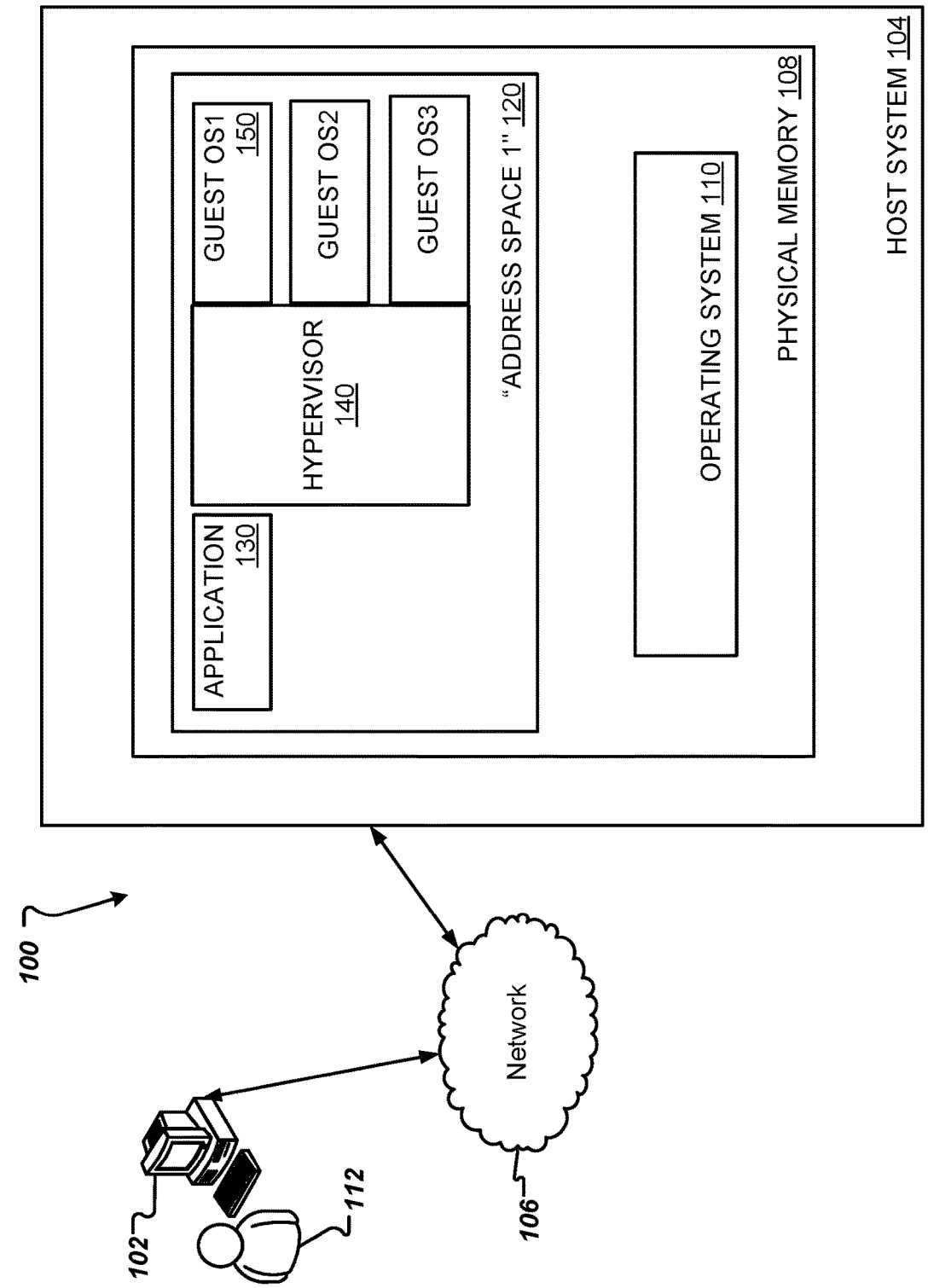
FIG. 1 illustrates an example computer system architecture that can be used to execute implementations of the present disclosure.

The present disclosure describes various tools and techniques for extending application's functionality in a secure manner by executing extension application logic at a virtual environment at an allocated memory in an address space of the application. Software applications may use custom code to extend their functionality and provide additional services and features implemented in that custom code. For example, a database system may be extended by a user, e.g. developer, with a statistical analytic functionality. The additional functionality, such as the statistical analytical functionality, may be provided by a different software provider than the one of the database system or by the same provider but as a separate software component. In such manner, an extended database system may serve requests associated with performing statistical analysis over data within the database. However, using custom code within an existing binary of an application may be associated with adverse effects on performance, reliability, and stability of a hosting system where the application is running.

There are different manners to extend an application or a system with custom-built functionality. In some instances, when an application has to be extended, it may be possible that the functionality is rebuilt within the application. Within the example of the database system, it may be possible that the external statistical analytical functionality is rebuilt as Structured Query Language (SQL) functions within the database. In another instances, the data that is associated with the external custom-built functionality may be extracted out of the system. In an external environment, the custom built logic may be executed as a separate system to preserve integrity of the whole data of the application, and then externally processed data and results may be re-inserted into the hosting system of the application. In yet another instance, it may be possible that the whole application's code is changed, e.g. re-written, and the new functionality is added in the lines of the pre-existing code or modifications thereof. In such cases, the changed code may be re-compiled as a fresh new binary that has the extension functionality.

In some instances, extending the functionality of an application with custom code using one of the approaches presented above may be associated with limited expressiveness, limitations on a programming language (e.g., SQL), reduced performance as multiple additional processing steps may be required, unavailability of the source code, e.g. extension custom code. The present solution described herein attempts to overcome these limitations and to provide a solution that may include extension functionality defined based on a technology that has full-featured program language expressiveness relevant for the extension functionality. The present solution described herein provides for executing extension functionality in a virtual environment that is running in an allocated memory of an address space of the application. The application may be configured to start a virtual environment to execute commands of the application that are associated with extension functionality.

According to implementations of the present disclosure, an application may be extended with custom functionality by recompleting an existing binary of the application with the capability to execute commands at a virtual environment. In such manner, the executable application may be linked to a hypervisor library. The hypervisor library may provide extension functionality that is used for executing extension application logic at a virtual environment that is managed by the hypervisor. The hypervisor may be software that runs on a host system and manages multiple virtual machines (VMs) that provide virtual processor resources and are associated with allocated memory. The virtual environment may be initiated within the address space of the application on a hosting system. The hypervisor may emulate instructions that are to be executed at the virtual environment.

Further, an application that is configured to execute extension functionality in a secure virtual manner, according to implementations of the present disclosure, may be executed within the address space of the application. Both the extension logic and the application that is to be extended run at the same address space and there is no separate different address spaces allocated for running the extension components in the relevant virtual environments. Thus, context switches between address spaces when executing scenarios associated with extension logic are reduced and performance of the application as a whole is improved, as the process is performing faster at one address space with the application.

According to implementations of the present disclosure, the application that is configured to be extendable and to executed extension code in a secure virtual environment at the same address space may not need to have code changes when new extension functionality is integrated. The application may be modified to communicate with external functionality once upfront and does not need to be modified if different extension logic is to be invoked and executed, as the application is integrated with a reference to a hypervisor library that manages the execution of the extension logic at the virtual environment.

In some aspects, as the application is recompiled to have the capability to executed extension functionality at a virtual environment, the application may be independent of the implementation code of the extension functionality. The extension functionality may be provided as a block that is not to be integrated in the application's source code. Thus, according to implementations of the present disclosure, the proposed solution provides better application performance and a secure manner for executing external custom code as separate logical blocks that process the relevant data in-memory at the virtual environment. The extension functionality may be provided as a compiled executable block that may be run at the virtual environment. In some other aspects, the extension functionality may be added as a modification to the application's source code and thus the extension may be integrated within the application.

Operating systems (OSs) may provide minimum viable code for staring and running an application. OSs may be compiled as software libraries and linked with an application, e.g. a web server, a chat application, an image recognition program, etc. An OS and extension application code may be compiled together to form an executable that associated with an application that is configured to be capable of executing extension functionality at a virtual environment. The OS and the extension application code in compiled form can be started on hardware or in a virtual environment provided by a VM, where the VM may simulate performance of a computer system.

In some instances, the hypervisor manages a virtual environment where an OS image that includes minimum viable code such as necessary components, libraries, binaries, etc. that are needed to run the extension functionality as loaded, and extension code may be run. The OS image is relatively small and light-weight, and thus is fast to boot at the virtual environment. The hypervisor includes a list of all VMs that are started in relation to the application. When the application is notified that an extension functionality is needed during application's execution, the hypervisor gets notified and starts a new VM. When a new VM is started, it is added to the list structure maintained by the hypervisor including the running VMs. In some instances, if different extension functionalities are requested while the application is executing, a new VM may be started for execution of a corresponding extension functionality. In other instances, already created VMs that are not used may be reused for a requested extension functionality to improve and make the execution process faster, as time for initializing the VM would be saved.

When an application is linked to a hypervisor library to run extension functionality in a secure manner at a virtual environment according to implementations of the present disclosure, the virtual environment is set up at an allocated memory of the application where a guest OS and application logic of the extension functionality is loaded. The guest OS runs on the VMs providing the virtual environment. The guest OS may provide minimum viable code for running an application and/or an extension application. The guest OS may include providing necessary components, library, binaries, other resources that are relevant for executing application functionality, such as the extension functionality. The application logic of the extension functionality is a computer program that includes instructions that are to be executed at the virtual environment when executing the application. For example, there may be different guest OSs, such as, IncludeOS, rumpkernel, MirageOS, OSv, etc., that can be used in combination with particular extension application logic. The guest OS may be determined to correspond to requirements and compatibility with the extension functionality and implementation. The guest OS may be such that supports applications that are limited to a particular platform when for example the source code of the extension is missing.

In some instances, when an application according to implementations of the present disclosure is executed at a host system, extension functionality is invoked. For example, a statistical function may be invoked from a database system, where the statistical functionality may be consumed through the host system. To safeguard the execution of the extension functionality from the execution of other application logic part of the hosted application, the virtual processor that supports the virtual machines may be restricted to a predefined part of the memory address space of the hosting process of the hosting application running at a host OS. The exchange of information and data between the hosting process of the application and the process at the virtual environment is configured based on a defined interface provided by the hypervisor library. In such manner, the host process may provide input data relevant for the extension functionality that is executed at the guest OS and receive output/result data. However, extension logic executed at the guest OS in relation to a request from the host process cannot access the memory of the host process and cannot access the application's data. Thus, isolation of data between the host system and the virtual environments is provided to maintain the integrity of the host system and to improve security of the data at the host system, which may not be affected by execution of extension functionality.

FIG. 1 illustrates an example computer system architecture 100 that can be used to execute implementations of the present disclosure. In the depicted example, the example computer system architecture 100 includes a client device 102, a network 106, and a host system 104. The host system 104 may include one or more server devices and databases, processors, memory. In the depicted example, a user 112 interacts with the client device 102.

In some examples, the client device 102 can communicate with the host system 104 over the network 106. In some examples, the client device 102 includes any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In some implementations, the network 106 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, the host system 104 includes at least one server and at least one data store. In the example of FIG. 1, the host system 104 is intended to represent various forms of servers including, but not limited to a web server, an application server, a proxy server, a network server, and/or a server pool. In general, server systems accept requests for application services and provides such services to any number of client devices (e.g., the client device 102 over the network 106).

In accordance with implementations of the present disclosure, and as noted above, the host system 104 can host an application 130 (e.g., provided as one or more computer-executable programs executed by one or more computing devices) that is running at an "Address space 1" 120 of physical memory 108. The host system 104 includes the physical memory 108, where Operating System 110 is loaded and where the application 130 runs. The application 130 runs at a defined address space—"Address Space 1" 120 at the physical memory 108.

The application 130 may provide functionality and serve end user requests. For example, the application 130 is a database system, where data is processed and stored. In some instances, it may be required that external code that is not trusted is to be executed in the same address space as that of the application 130. To secure the code of the application from the extension code, virtual environment process execution for the extension code may be embedded within the execution of processes of application 130. In such manner, additional security is provided by the isolation provided by the virtual environment. The application 130 may be configured to have the capability to be extended with external functionality and to execute VMs that may provide virtual environment for running the extension code. In such manner, the application 130 may provide extension functionality that runs in a secure manner to serve requests received at the application 130.

In accordance with implementations of the present disclosure, external extension functionality may be implemented and provided to application 130. An OS may be compiled as a library together with the extension functionality may be associated with the application 130. The guest OS and the extension may be compiled into one single binary code. They may have different sources and when built, they form a single executable program.

The application 130 has an executable that may be linked to a hypervisor 140 that is associated with the extension functionality. The application 130 as implemented may be modified and configured to communicate with the external functionality through interfacing with the hypervisor 140. Therefore, when the application 130 is started at the host system 104, it is capable of executing extension functionality through hypervisor 140 that manages a virtual environment where a guest OS, such as "Guest OS1" 150 may run together with the extension code. The guest OS and the extension functionality may be compiled together to generate an executable that may be started on hardware or in a virtual environment. The guest OS may be an OS in form of a light-weight software that includes just a minimum viable code that is needed to start a software application. The minimum viable code may be related to the technology used for the implementation of the extension functionality. Additional code may be included in some instances, as well. The guest OS may be such as that it corresponds to the implementation of the extension functionality. The OS may be selected when implementing the extension functionality to correspond to the requirements and technology for implementing the extension functionality. In some instances, the host operating system 110 that runs the hypervisor 140 (and the application 130 that is linked with the hypervisor 140) can be different from a guest OS that runs in the virtual environment. In some instances, more than one OS may be loaded in the virtual environment, e.g., Guest OS2, Guest OS3, etc. "Guest OS1" 150 is compiled as a library and is linked with the extension functionality and when invoked through the application 130, it may be executed in the virtual environment within a running process of application 130. The guest OS, such as "Guest OS1" may run as an embedded operating system for an extension mechanism provided by the hypervisor 140 to the application 130.

In some instances, the hypervisor 140 is a software running on the host operating system 110. The hypervisor 140 manages multiple VMs that provide virtual environment for running extension functionality. The hypervisor 140 provides memory to the virtual environment. VMs and respectively, the virtual environment, is managed by hypervisor. VMs need memory and Central Processing Unit (CPU) resources. When a VM is started, it simulates hardware and performance of a computing system. The hypervisor may put the processor in a special mode where if a special instruction is executed, it will be caught by the CPU and it will inform the hypervisor 140 to provide and set up a virtual environment. As the special instruction is executed, the hypervisor 140 is informed and emulates that instruction in the virtual environment.

The hypervisor 140 ensures that memory and processor resources are provided to the VMs. In some instances, the hypervisor 140 may be implemented independently of the host operating system 110. The hypervisor 140 includes a list of all initialized VMs. When the application 130 runs and is notified that an extension functionality is needed, the application 130 communicates with the hypervisor 140 to start a new VM. In such manner, the hypervisor 140 is informed to set up a virtual environment and to emulate the instructions received from the application 130 into the virtual environment. The new VM may be added to the list maintained by the hypervisor 140. Therefore, when a new extension functionality is requested through the application 130, a new VM is started by the hypervisor 140.

In some instances, VMs may include one or more threads that function as a virtual processor and allocated memory to run. VMs forming virtual environments may be arranged to work inside of the common address space, and not to see each other executions. Memory is allocated in the "Address Space 1" 120 of the application 130 for the virtual environment in relation to execution of commands associated with extension functionality. The memory allocated for the virtual environment includes two parts. The memory includes memory used to manage the virtual environment such as the register values of the virtual processor and other data needed to describe a VM. Further, the memory includes main memory that is used by the extension functionality to store data and results. For example, the stored data may include executable binary code. As the hypervisor 140 runs the virtual environment at the allocated "Address space 1" 120 for the application 130, the application 130 may communicate in memory with the virtual environment. The application 130 can access all the memory that the VM has, but not vice versa. In such manner, extension code that runs in the virtual environment has access to data within the boundaries of the virtual environment provided by the VM(s).

Once the virtual environment is initialized, the hypervisor 140 may identify the instruction that is associated with the extension functionality. In some implementations of the present disclosure, the hypervisor 140 may identify multiple instructions that are associated with the extension functionality. Based on the identified instruction, the hypervisor 140 may determine the extension functionality that is associated with the instruction and emulate that extension functionality in the virtual environment. When the application 130 is running, the application 130 is the owner of a process associated with requested operations initiated from the application 130. When the process is associated with extension logic, it also includes executions performed at the VMs. Such a process may run as a single process leveraged within a common address space extending at the virtual environment. One hypervisor, i.e., hypervisor 140, may be working with all of the guest OS loaded at the virtual environment. The hypervisor 140 may be configured internally to communicate with the different guest OSs.

At the initialized virtual environment, guest OSs, such as "Guest OS1" 150, are loaded. The guest OSs are loaded together with the extension logic, which is extracted and copied at the allocated memory of the virtual environment. Therefore, executed commands during runtime of the application 130 at the host system 104 are processed. When a command is associated with starting a VM, that command is executed at the started VM where the guest OS and the extension logic are running. Once the command is executed at the virtual environment, the VM may be stored. VMs where there are no running commands may be cleaned up from the memory allocated for the virtual environment. In some instances, when a virtual environment is stopped and ready to deallocate the memory, the organization of the virtual environments for executing extension functionality may be enhanced by providing the capability to reuse a part of the virtual environment that include the complete code of the extension logic in another virtual environment or the same virtual environment For example, it may be reused for another command execution.

Figure 2:
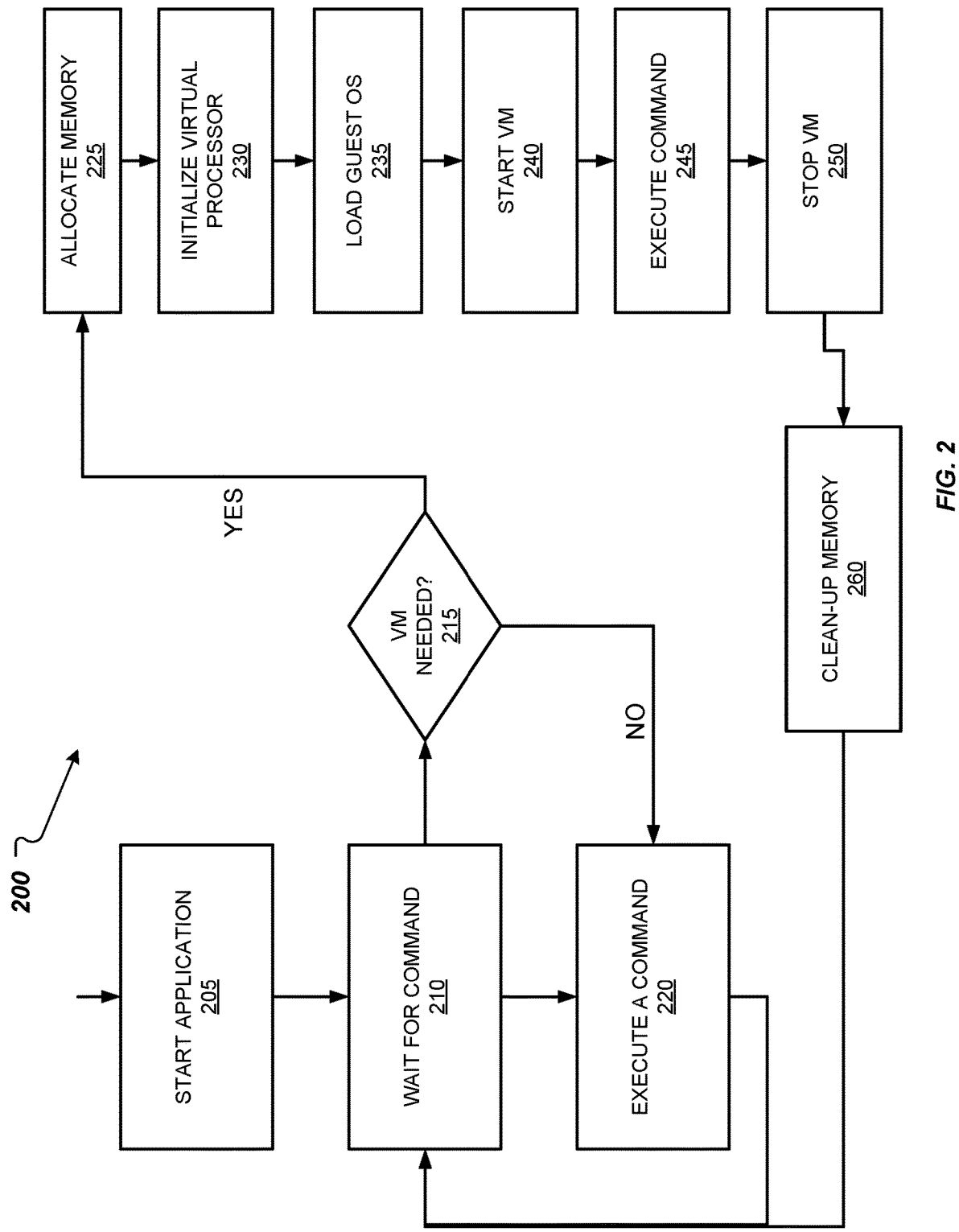
FIG. 2 is a flow chart of an example method for executing an extension application logic at a virtual environment running in allocated memory at an address space of an application, according to implementations of the present disclosure.

FIG. 2 is a flow chart of an example method 200 for executing an extension application logic at a virtual environment running in allocated memory at an address space of an application, according to implementations of the present disclosure. It will be understand that method 200 and related methods may be performed, for example, by any suitable system, environment, software, and hardware, or a combination of systems, environments, software, and hardware, as appropriate. In some implementations, the example method 200 and related methods are executed by one or more components of the system 100 described above with respect to FIG. 1.

At 205, an application is started. The application may be such as the application 130, FIG. 1. The application may be started by a customer, end user, etc. through an interface of the application. The application may be implemented to link to extension functionality which may be securely executed at a virtual environment managed by a hypervisor, such as the described hypervisor and virtual environment in relation to description above, e.g. related to FIG. 1. The application may include a command for starting the virtual environment for the extension functionality. The hypervisor may be provided as a compiled library for interfacing with the application in relation to execution of a command associated with the extension functionality. A guest OS may be defined to be linked to extension functionality. The guest OS and the extension functionality as implemented are provided to the application. The application includes a command for starting the virtual environment for the extension functionality. At 210, during the execution of the application, commands are executed in sequence. At 215, commands are evaluated to determine whether a VM is needed for the execution of the given command. When the command is related to extension functionality associated with the application 130, the application 130 is enhanced to interface with a hypervisor.

At 220, when it is determined that the evaluated command is not associated with extension functionality that requires execution at a virtual environment, the command is executed at the computing environment of the application. Once the command is started for execution, the application may execute a next subsequent command, where commands of the application are in turn iteratively evaluated at 210. Further, commands may be evaluated also in parallel. At 225, the evaluated command is associated with extension functionality to be provided by the application and therefore memory is allocated for initializing a virtual environment for executing the extension functionality. At such a virtual environment, the identified command is to be executed. The allocated memory is defined in an address space of the application. For example, in the context of FIG. 1, the memory for the virtual environment is allocated by the hypervisor 140 at the "Address Space 1" 120 of the application 130.

At 230, the virtual environment is initialized that includes initializing a virtual processor. One or more registers may be setup for the virtual processer to define initial values to a specific memory location in the virtual environment and the internal state of the virtual processor. The hypervisor may communicate with the operating system running on a host system where the application runs and limits the visible accessible memory of the virtual processor to the main memory defined in the virtual environment.

At 235, when the virtual processor is initialized, the guest OS is loaded together with the logic implementing the extension functionality into the allocated memory for the virtual environment. In an alternative implementation, the guest OS may be first loaded together with the extension logic into the allocated memory, and then the virtual processor may be initialized. In such manner, 230 is performed after 235. At 240, the virtual environment is started by starting the VMs defined by the hypervisor. The virtual environment is started to execute the guest OS and the application logic of the extension functionality. At 245, the identified command at 210 is executed at the virtual environment. The execution of the command may be associated with data of the started application in the allocated memory. Such data may be transferred from the memory of the application, to the allocated memory of the virtual environment. In such manner, the extension application logic works in-memory with relevant data for the extension functionality. In some instances, the data may be provided into the memory of the virtual environment as a read-only data and/or as a read-write data.

At 250, the virtual environment is stopped once the execution of the command is completed. At 260, the memory allocated for the virtual environment for the execution of the identified command is cleaned up, and that memory is deallocated for use for other virtual environments initialized for other identified command at 210. In some instances, just part of the memory may be cleaned up, namely that part which includes sensitive data for the functionality execution. The part that is included the implemented extension logic may be reused for executing the same extension functionality. Therefore, the execution time will be improved as time will be saved for initializing and staring a new virtual machine.

In some implementations according to the present disclosure, once a command that is associated with a VM is identified at 215, a first thread may be created for the execution of that command at the virtual environment. If commands are evaluated in parallel, then more than one thread may be created in parallel. The application may proceed to initiate execution of commands even through a previous command had not been yet completed. In response to identifying a second command that is also associated with a VM, a second thread separate from the first one may be created at the virtual environment. That second thread may run in parallel with the first thread to improve on application performance.

Figure 3:
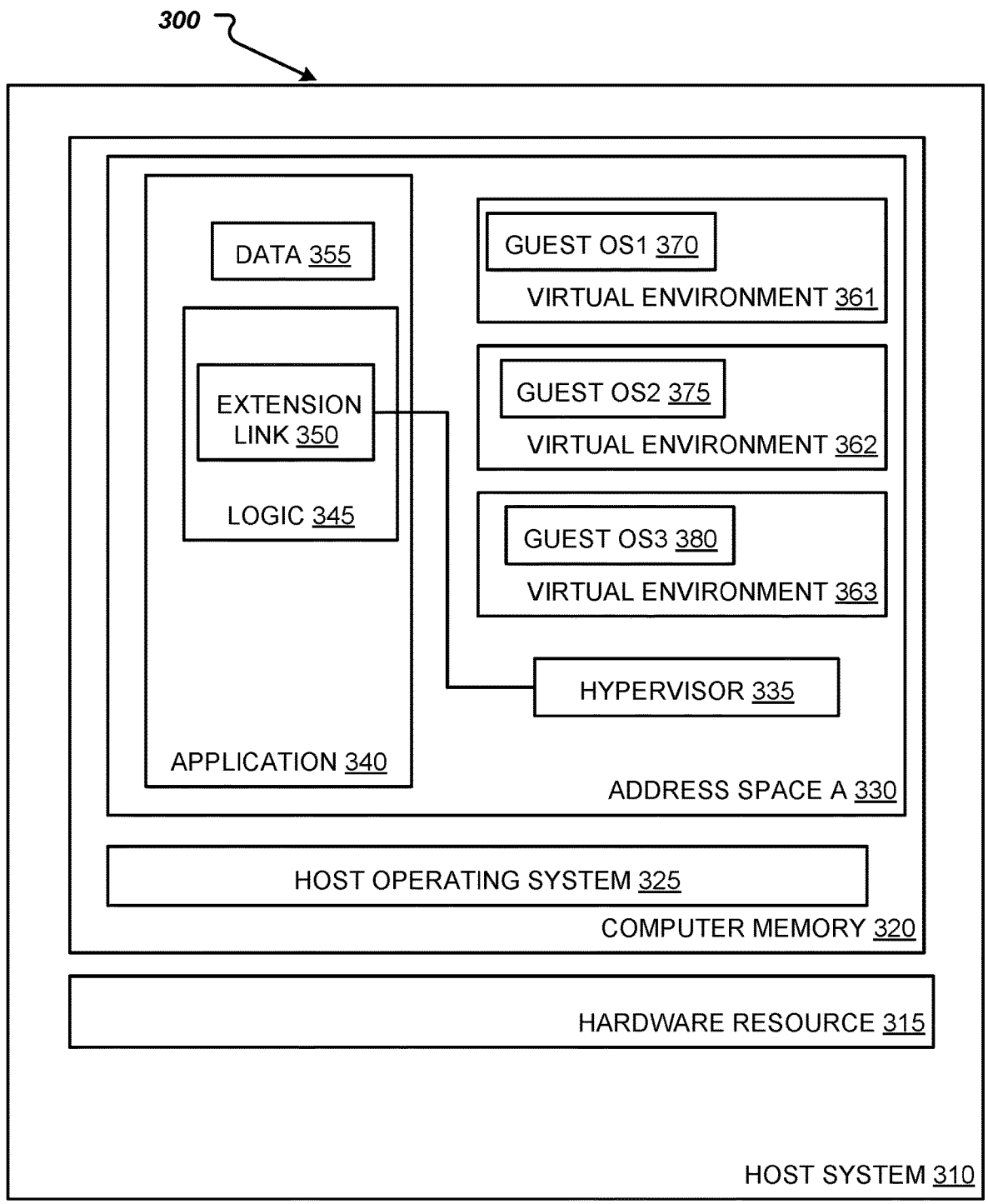
FIG. 3 is a block diagram of an example computer system architecture of a host system where an application associated with extension functionality provided by a hypervisor is provided, according to implementations of the present disclosure.

FIG. 3 is a block diagram of an example computer system architecture 300 of a host system 310 where an application associated with extension functionality provided by a hypervisor 335 is provided, according to implementations of the present disclosure. In some implementations, the host system 310 may be such as the host system 104, FIG. 1. The host system 310 in provided to run and provide hardware resources 325 and computer memory 320 that may be consumed by software applications running on the host system 310.

In accordance with implementations of the present disclosure, an application 340 may be started to run on the host system 315. The application may be such as the application 130, FIG. 1, or the started application 205, FIG. 2. In some instances, the application 340 may be built on top of an existing application that is enhanced to perform extension functionality in a secure manner. The application 340 may include logic 345 implemented to provide services and functionality. The application 340 also includes data 355. The application 340 may be linked via an extension link 350 to an extension functionality through interfacing with hypervisor 335. Hypervisor 335 may be such as hypervisor 140, FIG. 1. The extension functionality may be externally provided source code of an application that is compiled together with an OS, such as a guest OS, as described in relation to FIG. 1 and FIG. 2. The extension functionality may be run in a virtual environment, such as virtual environment 361, 362, 363. A virtual environment may be set up at the same address space, address space A 330, where the application 340 is running. Memory in address space A 330 of the application 340 may be allocated for running the virtual environments in relation to execution of a command related to extension functionality of the application 340.

As illustrated, application 340 may be interfacing with the hypervisor 335. The hypervisor 335 manages the virtual environments 361, 362 and 363 and starts one or more VMs in relation to execution of extension functionality for the application 340. The virtual environments 361, 362, and 363 are started to correspondingly execute guest OSs and the application logic of the extension functionality. To start a virtual environment, a virtual processor is initialized for the execution of commands at the virtual environment. The hypervisor 335 may load guest OSs—guest OS1 370, guest OS2 375, and guest OS3 380, and also may copy application logic of the extension functionality into the allocated memory for running at corresponding virtual environments 361, 362 and 363. The guest OSs and the extension functionality are provided as a single compiled entity. The guest OS is uploaded in the address space memory allocated by the application together with the extension implemented code. In such manner, the guest OS and the extension implementation code are extracted and copied into the memory space and allocated memory. Then the guest OS is loaded and a virtual processor is started, which points to start the guest OS and to the implemented extension logic.

In some instances, some data from the application may be placed into the virtual environment, e.g. as read only data, or as read-and-write data. Therefore, execution of instructions in relation to that data is faster, as it is stored in-memory, and thus provides improved application operations. The virtual environments 361, 362 and 363 are initialized and may be started to support execution of commands related to the extension functionality of the application 340. Once calculations and/or computations of the extension functionality are performed at a virtual environment, for example, at virtual environment 361, output of that functionality may be provided to the application 340 and stored in applications data storage, for example as part of data 355. Once the extension functionality has finished its execution, the started VMs are stopped and the allocated memory for the virtual environment may be deallocated or cleaned up, in whole or in part.

The performed computations at the virtual environments may not affect the data stored at data 355, as part of the data 355 associated with the extension functionality is copied and transferred in the allocated memory space. The virtual processor of a virtual environment may not read memory that is outside of the allocated memory for the virtual environment. Therefore, executions of the extension functionality may be performed only over data that is within the allocated memory of the virtual environment at address space A 330 of the application 340. The hypervisor 335 may be configured to monitor whether a virtual processor wants to perform or access data out of the allocated range and if so, the hypervisor may terminate the VM before it performs any action.

Figure 4:
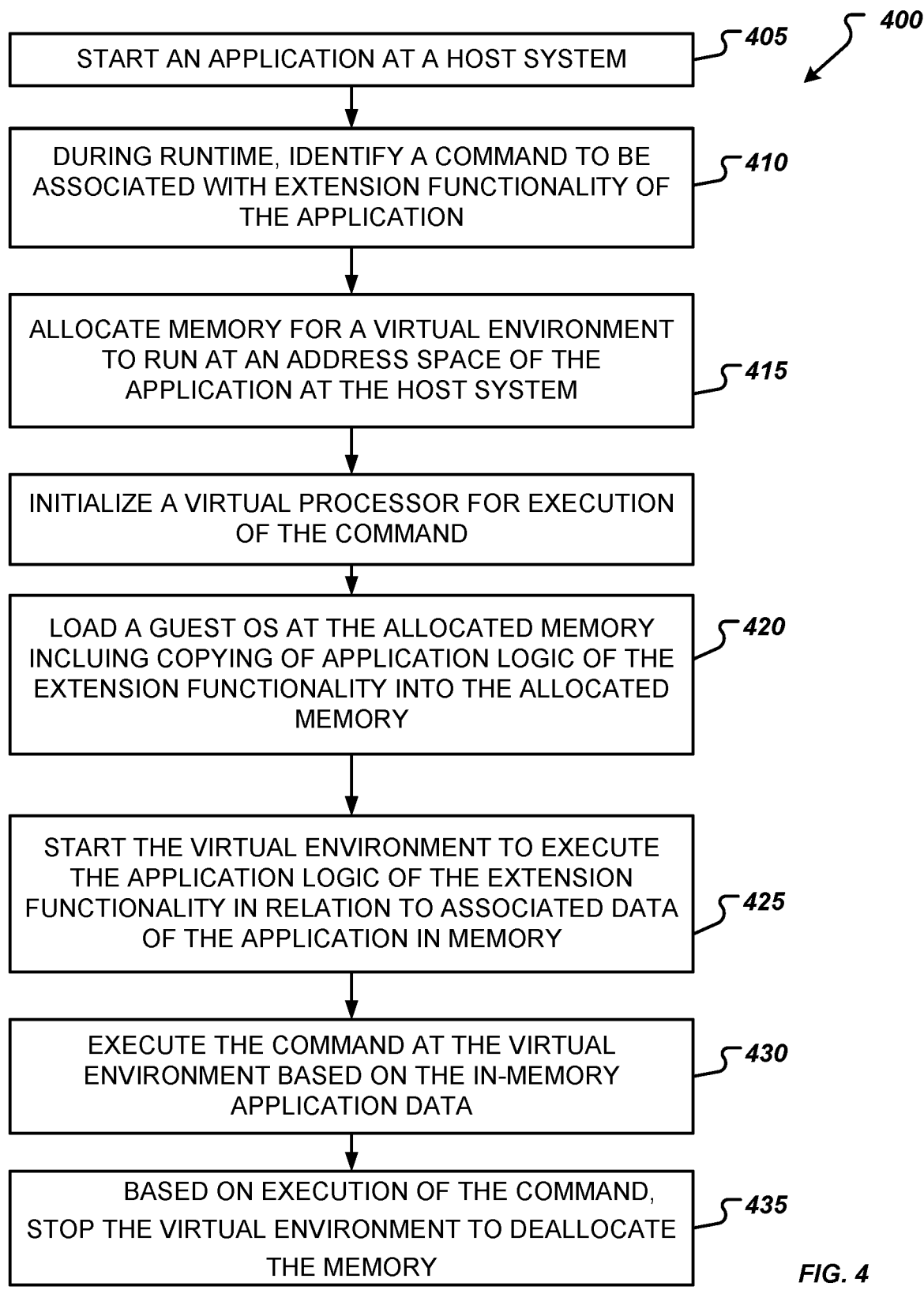
FIG. 4 is a flow chart of an example method for running an application associated with extension functionality executed at a secure manner at a virtual environment based on in-memory application data, according to implementations of the present disclosure.

FIG. 4 is a flow chart of an example method 400 for running an application associated with extension functionality executed at a secure manner at a virtual environment based on in-memory application data, according to implementations of the present disclosure. The process 400 may be implemented in a server system, such as the host system 104 of FIG. 1, or host system 310, FIG. 3. The example process 400 may be implemented as a computer-implemented process executed by one or more processors.

At 405, an application is started to run at a host system. The host system may be such as the host system 104, FIG. 1, and/or host system 310, FIG. 3. According to implementations of the present disclosure, the application may be configured to executed extension functionality in a secure manner at a virtual environments running at the application's address space. The application may be implemented as a cloud application. The application may be linked to a hypervisor providing guest OSs and extension code relevant for providing the extension functionality at the virtual environment. The hypervisor, the provided guest OSs, and extension code may be such as those described above in relation to implementations of the present disclosure.

At 410, during runtime of the application, a command is identified to be associated with extension functionality of the application. The hypervisor may be provided as a compiled library for interfacing with the application in relation to execution of the identified command related to the extension functionality. At 415, memory for running a virtual environment is allocated. The allocated memory is at an address space of the application at the host system. At 420, a virtual processor is initialized for execution of the identified command.

At 425, a guest OS is loaded and application logic of the extension functionality is copied into the allocated memory. In some instances, more than one guest OSs may be loaded. The implementation code of the extension functionality is copied at the allocated memory at the virtual environment.

At 430, the virtual environment is started to execute the application logic of the extension functionality. Data that is associated with the extension logic and is stored at the application may be transferred in the memory of the virtual environment for in-memory processes at the guest OS.

At 435, the identified command is executed at the virtual environment based on the in-memory application data. The output of the command executed at the virtual environment may be provided to the application. In some cases, the output may be stored at a data storage of the application and the host system, or it may be directly provided to an end user, e.g. at a user interface of the application. At 440, based on the command execution, the virtual environment is stopped. VMs that are defined for the virtual environment may be stopped and cleaned up to deallocate memory used for those VMs for other VMs that may be needed in relation to other identified commands.

The preceding figures and accompanying description illustrate example processes and computer-implementable techniques. But system 100 (or its software or other components) contemplates using, implementing, or executing any suitable technique for performing these and other tasks. It will be understood that these processes are for illustration purposes only and that the described or similar techniques may be performed at any appropriate time, including concurrently, individually, or in combination. In addition, many of the operations in these processes may take place simultaneously, concurrently, and/or in different orders than as shown. Moreover, the described systems and flows may use processes and/or components with or performing additional operations, fewer operations, and/or different operations, so long as the methods and systems remain appropriate.

In other words, although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A computer-implemented method comprising:
providing a hypervisor as a compiled library for interfacing with an application in relation to an execution of an extension functionality of the application, wherein the hypervisor runs on a host system and manages a virtual environment, wherein the virtual environment includes one or more virtual machines providing virtual processor resources and associated with allocated memory portion within an address space of the application on the host system;
initializing a first virtual processor at a virtual machine managed by the hypervisor for an execution of a command associated with the execution of the extension functionality of the application; and
starting the virtual environment and executing application logic of the extension functionality in the virtual environment, wherein the execution of the application logic of the extension functionality is embedded into an execution of a host process running at the application, wherein the execution of the application logic of the extension functionality is performed on data copied by the host process at the allocated memory portion within the address space of the host system for the virtual environment, wherein the host process at the application and the extension functionality of the application are executed at the same address space of the application on the host system to share context between the application and the extension functionality when executing scenarios associated with the extension functionality, and wherein a memory portion of memory of the address space associated with the host process is inaccessible to the extension functionality of the application.

2. The method of claim 1, wherein the virtual environment is configured for execution of commands related to the extension functionality of the application, wherein the commands are identified as related to the extension functionality during runtime of the application.

3. The computer-implemented method of claim 2 further comprising:
starting the application to execute the commands at the host system;
identifying the command related to the extension functionality of the application during runtime of the application; and
in response to determining that the virtual processor is to be initialized for the execution of the command, initializing the virtual processor for the execution of the command.

4. The computer-implemented method of claim 1, further comprising:
copying the data related to the extension functionality into the allocated memory for the virtual environment as read-only data;
executing the command at the virtual environment based on the data as stored in-memory; and
in response to completing the execution of the command, stopping the virtual environment to deallocate the memory.

5. The computer-implemented method of claim 1, further comprising:
loading a first guest OS at the allocated memory; and
copying the application logic of the extension functionality into the allocated memory, wherein the application logic of the extension functionality has restricted access to the memory of the host process.

6. The computer-implemented method of claim 5, wherein initializing the first virtual processor includes setting up a register for the first virtual processor, and wherein the first virtual processor is operable to manage one or more guest OS, wherein the first virtual processor is initialized at the virtual environment and is restricted to the allocated memory portion within the address space of the application.

7. The computer-implemented method of claim 5, wherein the first guest OS includes minimum viable code required to execute the command and the extension functionality of the application, and wherein the first guest OS is compiled as a library and linked with the extension functionality.

8. The computer-implemented method of claim 1, further comprising:
in response to identifying the command for execution as a first command, creating a first thread for executing the first command at the virtual environment; and
in response to identifying a second command, creating a second thread separate from the first thread, the second thread for execution at the virtual environment in parallel with the first thread.

9. The computer-implemented method of claim 1, further comprising:
in response to executing the command at the virtual environment, determining to reuse the started virtual environment for execution of another command different from the executed command, wherein the other command is associated with the execution of the extension functionality of the application.

10. The computer-implemented method of claim 1, further comprising:
in response to execution of the command at the virtual environment, partially cleaning the allocated memory for the virtual environment to remove stored sensitive data for the execution of the command; and
reusing the application logic of the extension functionality as running at the virtual environment for a subsequent executing of the application logic of the extension functionality.

11. A non-transitory, computer-readable medium storing computer-readable instructions executable by a computer and configured to:
provide a hypervisor as a compiled library for interfacing with an application in relation to an execution of an extension functionality of the application, wherein the hypervisor runs on a host system and manages a virtual environment, wherein the virtual environment includes one or more virtual machines providing virtual processor resources and associated with allocated memory portion within an address space of the application on the host system;
initialize a first virtual processor at a virtual machine managed by the hypervisor for an execution of a command associated with the execution of the extension functionality of the application; and starting the virtual environment and executing application logic of the extension functionality in the virtual environment, wherein the execution of the application logic of the extension functionality is embedded into an execution of a host process running at the application, wherein the execution of the application logic of the extension functionality is performed on data copied by the host process at the allocated memory portion within the address space of the host system for the virtual environment, wherein the host process at the application and the extension functionality of the application are executed at the same address space of the application on the host system to share context between the application and the extension functionality when executing scenarios associated with the extension functionality, and wherein a memory portion of memory of the address space associated with the host process is inaccessible to the extension functionality of the application.

12. The computer-readable medium of claim 11, wherein the virtual environment is configured for execution of commands related to the extension functionality of the application, wherein the commands are identified as related to the extension functionality during runtime of the application, and wherein the computer-readable medium further comprises instructions which when executed by the computer cause to:
   start the application to execute the commands at the host system;
   identify the command related to the extension functionality of the application during runtime of the application; and
   in response to determining that the virtual processor is to be initialized for the execution of the command, initialize the first virtual processor for the execution of the command.

13. The computer-readable medium of claim 11, further comprising instructions which when executed by the computer cause to:
   provide the data related to the extension functionality into the memory of the virtual environment as read-only data;
   execute the command at the virtual environment based on the data as stored in-memory; and
   in response to completing the execution of the command, stop the virtual environment to deallocate the memory.

14. The computer-readable medium of claim 11, further comprising instructions which when executed by the computer cause to:
   load a first guest OS at the allocated memory;
   copy the application logic of the extension functionality into the allocated memory, wherein the application logic of the extension functionality has restricted access to the memory of the host process;
   in response to identifying the command for execution as a first command, create a first thread for executing the first command at the virtual environment; and
   in response to identifying a second command, create a second thread separate from the first thread, the second thread for execution at the virtual environment in parallel with the first thread.

15. The computer-readable medium of claim 14, wherein initializing the first virtual processor includes setting up a register for the first virtual processor, and wherein the first virtual processor is operable to manage one or more guest OS, wherein the first virtual processor is initialized at the virtual environment and is restricted to the allocated memory portion within the address space of the application, wherein the first guest OS includes minimum viable code required to execute the command and the extension functionality of the application, and wherein the first guest OS is compiled as a library and linked with the extension functionality.

16. The computer-readable medium of claim 11, further comprising instructions which when executed by the computer cause to:
   in response to execution of the command at the virtual environment, partially clean the allocated memory for the virtual environment to remove stored sensitive data for the execution of the command; and
   reuse the application logic of the extension functionality as running at the virtual environment for a subsequent executing of the application logic of the extension functionality.

17. A system comprising:
   at least one processor; and
   non-transitory memory communicatively coupled to the at least one processor and having instructions stored thereon which, when executed by the at least one processor, cause the at least one processor to perform operations, the operations comprising:
      providing a hypervisor as a compiled library for interfacing with an application in relation to an execution of an extension functionality of the application, wherein the hypervisor runs on a host system and manages a virtual environment, wherein the virtual environment includes one or more virtual machines providing virtual processor resources and associated with allocated memory portion within an address space of the application on the host system;
      initializing a first virtual processor at a virtual machine managed by the hypervisor for an execution of a command associated with the execution of the extension functionality of the application; and
      starting the virtual environment and executing application logic of the extension functionality in the virtual environment, wherein the execution of the application logic of the extension functionality is embedded into an execution of a host process running at the application, wherein the execution of the application logic of the extension functionality is performed on data copied by the host process at the allocated memory portion within the address space of the host system for the virtual environment, wherein the host process at the application and the extension functionality of the application are executed at the same address space of the application on the host system to share context between the application and the extension functionality when executing scenarios associated with the extension functionality, and wherein a memory portion of memory of the address space associated with the host process is inaccessible to the extension functionality of the application.

18. The system of claim 17, wherein the virtual environment is configured for execution of commands related to the extension functionality of the application, wherein the commands are identified as related to the extension functionality during runtime of the application, wherein the memory comprises further instructions, which when executed by the at least one processor, cause the at least one processor to perform operation, the operations comprising:
   providing the data related to the extension functionality into the memory of the virtual environment as read-only data;

executing the command at the virtual environment based on the data as stored in-memory; and in response to completing the execution of the command, stopping the virtual environment to deallocate the memory.

19. The system of claim 17, wherein the memory comprises further instructions, which when executed by the at least one processor, cause the at least one processor to perform operation, the operations comprising:

in response to identifying the command for execution as a first command, creating a first thread for executing the first command at the virtual environment; and in response to identifying a second command, creating a second thread separate from the first thread, the second thread for execution at the virtual environment in parallel with the first thread.

20. The system of claim 17, wherein the memory comprises further instructions, which when executed by the at least one processor, cause the at least one processor to perform operation, the operations comprising:

in response to execution of the command at the virtual environment, partially cleaning the allocated memory for the virtual environment to remove stored sensitive data for the execution of the command; and reusing the application logic of the extension functionality as running at the virtual environment for a subsequent executing of the application logic of the extension functionality.

* * * * *